United States Patent [19]

Dunphy et al.

[11] Patent Number: 5,604,836
[45] Date of Patent: Feb. 18, 1997

[54] OPTICAL FIBER ENTRY STRAIN RELIEF INTERFACE FOR COMPRESSION-MOLDED STRUCTURES

[75] Inventors: James R. Dunphy, South Glastonbury; Robert M. Rukus, South Windsor, both of Conn.; Jong-Min Ha, Seoul, Rep. of Korea

[73] Assignee: United Technologies Corporation, Hartford, Conn.

[21] Appl. No.: 570,049

[22] Filed: Dec. 11, 1995

[51] Int. Cl.$^6$ .................................................. G02B 6/00
[52] U.S. Cl. ................................................................ 385/138
[58] Field of Search ................................ 385/92, 94, 95, 385/98, 138, 139, 140, 147, 88, 89; 174/DIG. 8, 110 R, 113 R, 70 S; 250/227.24, 227.31, 678, 701; 439/63, 581; 333/156, 160, 243, 260

[56] References Cited

U.S. PATENT DOCUMENTS

| | | | |
|---|---|---|---|
| 4,783,137 | 11/1988 | Kosman et al. | 385/102 |
| 4,896,939 | 1/1990 | O'Brien | 385/101 |
| 4,897,711 | 1/1990 | Blonder et al. | 385/88 |
| 4,945,400 | 7/1990 | Blonder et al. | 385/15 |
| 4,948,222 | 8/1990 | Corke et al. | 385/100 |
| 4,995,695 | 2/1991 | Pimpinella et al. | 385/92 |
| 5,037,172 | 8/1991 | Hekman et al. | 385/123 |
| 5,155,786 | 10/1992 | Ecker et al. | 385/92 |
| 5,241,614 | 8/1993 | Ecker et al. | 385/94 |
| 5,304,969 | 4/1994 | Jacobowitz et al. | 439/581 |
| 5,335,305 | 8/1994 | Kosa et al. | 385/147 |
| 5,399,854 | 3/1995 | Dunphy et al. | 250/227.17 |
| 5,477,323 | 12/1995 | Andrews et al. | 385/12 |
| 5,500,917 | 3/1996 | Daniel et al. | 385/99 |
| 5,515,465 | 5/1996 | Olin et al. | 385/64 |

FOREIGN PATENT DOCUMENTS

RM93A0253  4/1993  Italy.

*Primary Examiner*—Akm E. Ullah
*Attorney, Agent, or Firm*—Gerald L. Depardo

[57] ABSTRACT

An optical fiber entry strain relief interface includes a composite structure (lay-up) 10 having an optical fiber 20 embedded therein. The optical fiber 20 enters (or exits) the lay-up 10 at at least one point 24 and passes through transition layers 47 comprising an adhesive film 42, a thin rubber sealing layer 44, and a thick rubber strain relief layer 46, and through a polymer plug 48 located above the layer 46. The lay-up is consolidated by heating the lay-up over a temperature profile and applying pressure through mostly closed compression molding tools 30,32. The adhesive film 42 bonds the adjacent layer 44 to the upper surface of the lay-up 10, the sealing layer 44 becomes soft enough to seal around the fiber 20 at a temperature lower than the temperature at which the resin 16 exhibits a low enough viscosity to leak out of the lay-up 10, thereby preventing the resin from leaking out of the lay-up 10 during lay-up consolidation, the strain relief layer 46 provides a rubber strain relief for the optical fiber 20, and the plug 48 supports the layers 47 during consolidation.

25 Claims, 5 Drawing Sheets

OPTICAL FIBER ENTRY STRAIN RELIEF INTERFACE FOR COMPRESSION-MOLDED STRUCTURES

TECHNICAL FIELD

This invention relates to the field of structures and more particularly to embedding optical fibers within structures.

BACKGROUND ART

It is known in the art of manufacturing composite structures that a composite structure may be fabricated using numerous different techniques such as an autoclave process (e.g., using a vacuum bag) or a closed, or partially, or mostly closed mold process (e.g., using a hot press). It is also known that an optical fiber may be embedded within the structure during fabrication as discussed in U.S. Pat. No. 5,399,854 entitled "Embedded Optical Sensor Capable of Strain and Temperature Measurement Using a Single Diffraction Grating", to Voto et al. In particular, it is known to place an optical fiber having one or more gratings embedded therein between plies or lamination layers of the structure (or lay-up). The layers typically comprise reinforcing filaments surrounded by thermal setting epoxy resin. The lay-up is then consolidated in a process which applies pressure and heat to the lay-up, such as an autoclave or hot press, which causes polymerization, curing, and consolidation of the structure.

Also, the embedded fiber must be protected from breakage at the point where the optical fiber enters the composite structure. One such technique which discusses fiber entry into a composite structure in an autoclave process is described in Italian Patent No. RM93A000253, entitled "Method for Embedding Optical Fiber Sensors into Composite Structures", to P. Ferraro, et al. In that process, the lay-up is placed on a lower supporting surface and an upper entry point of the fiber is surrounded with a thick rubber strain relief layer.

Then, using an autoclave process that employs vacuum bagging, a thin plastic layer (or membrane or bag) is placed over one side of the lay-up and sealed to a support surface upon which the lay-up rests. A vacuum is drawn in the volume in which the lay-up is encapsulated between the bag and the supporting surface such that the bag collapses onto the outer surface of the lay-up, thereby applying a predetermined amount of pressure onto the lay-up. At the entry point of the optical fiber, the bag forms a dome-shaped contour containing the thick rubber at the entry point of the optical fiber, thereby allowing the thick rubber to cure (concurrently while the structure itself is curing) on the surface of the structure to create a seal at the location where the optical fiber enters (and/or exits) the lay-up.

The resultant seal configuration has a thick, e.g., about 0.1 inches(") thick, dome-shaped rubber interface on the surface of the lay-up which is bonded to the optical fiber at the point that the fiber enters the composite structure. Such a rubber interface seals the entry point of the optical fiber to eliminate resin flow through the rubber interface, as well as provides a pliable strain-relief interface between the optical fiber and the composite structure to reduce the possibility of fiber damage or breakage at the entry point due to fiber bending.

While applying such a thick rubber interface works well in an autoclave process, such an interface does not work when the composite structure is manufactured using a hot press (i.e., compression-molding with a closed or mostly closed molding tool).

More specifically, a hot press with closed or mostly closed tools exerts much more force on the lay-up than an autoclave process, thereby causing the resin to secrete from (or leak or bleed out of) the lay-up through the fiber entry hole in the lay-up and around the fiber. Also, if the thick rubber interface of the prior art is placed over the fiber entry holes, and the hot-press tool is pressed around that hole, resin will squeeze through the fiber entry point in the lay-up and through the fiber hole in the rubber interface. This creates a resin-coated stiffened section of optical fiber at the fiber entry point where stress concentrations from the fiber bending leads to fiber breakage, thereby making the rubber seal stress-relief ineffective.

Thus, it would be desirable to obtain a rubber interface at the entry point of the optical fiber to a composite structure which, when the structure is consolidated using a compression processes with a closed or mostly closed molding tool (e.g., a hot press), retains a rubber seal stress-relief interface at the fiber entry point.

DISCLOSURE OF INVENTION

Objects of the invention include provision of an optical fiber entry strain relief interface for enhanced sealing of a composite structure made by compression-molding.

According to the present invention an optical fiber interface comprises a structure comprising structure bonding material; an optical fiber entering the structure at a fiber entry point and being embedded within the structure; sealing means, disposed on the structure and having the fiber passing therethrough at a sealing pass-through region, for sealing around the fiber at the sealing pass-through region and for preventing the bonding material from leaking through the sealing means at the sealing pass-through region; strain relief means, disposed adjacent to and contiguous with the sealing means and having the fiber passing therethrough at a strain relief pass-through region, for providing strain relief of the fiber near the fiber entry point; and the sealing means for bonding the strain relief means to the structure.

According further to the present invention, the sealing means comprises a sealing layer which prevents the bonding material from leaking through the sealing pass-through region; and an adhesive layer having the fiber passing therethrough at the strain relief pass-through region, which bonds the sealing layer to the structure.

According still further to the present invention, the sealing layer comprises a material which becomes soft enough to seal around the fiber at the sealing pass-through region at a temperature lower than the temperature at which the bonding material exhibits a viscosity low enough to leak out of the structure, thereby preventing the bonding material from leaking through the sealing pass-through region during consolidation of the structure.

The present invention represents a significant improvement over the prior art by providing a strain-relief interface for an optical fiber at the entry point(s) of the fiber to a composite structure when the composite structure is consolidated (or cured) using compression molding with a closed or mostly closed molding tools (e.g., in a hot press). For certain structures, compression molding with a hot press is an acceptable manufacturing method alternative to autoclave fabrication methods. Also, the structure need not be a composite structure. This invention makes the integration of optical fiber sensors into structures (or lay-ups) more practical when using such compression molding methods. Further, the invention will work with compression molding or with resin transfer or resin injection molding processes.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
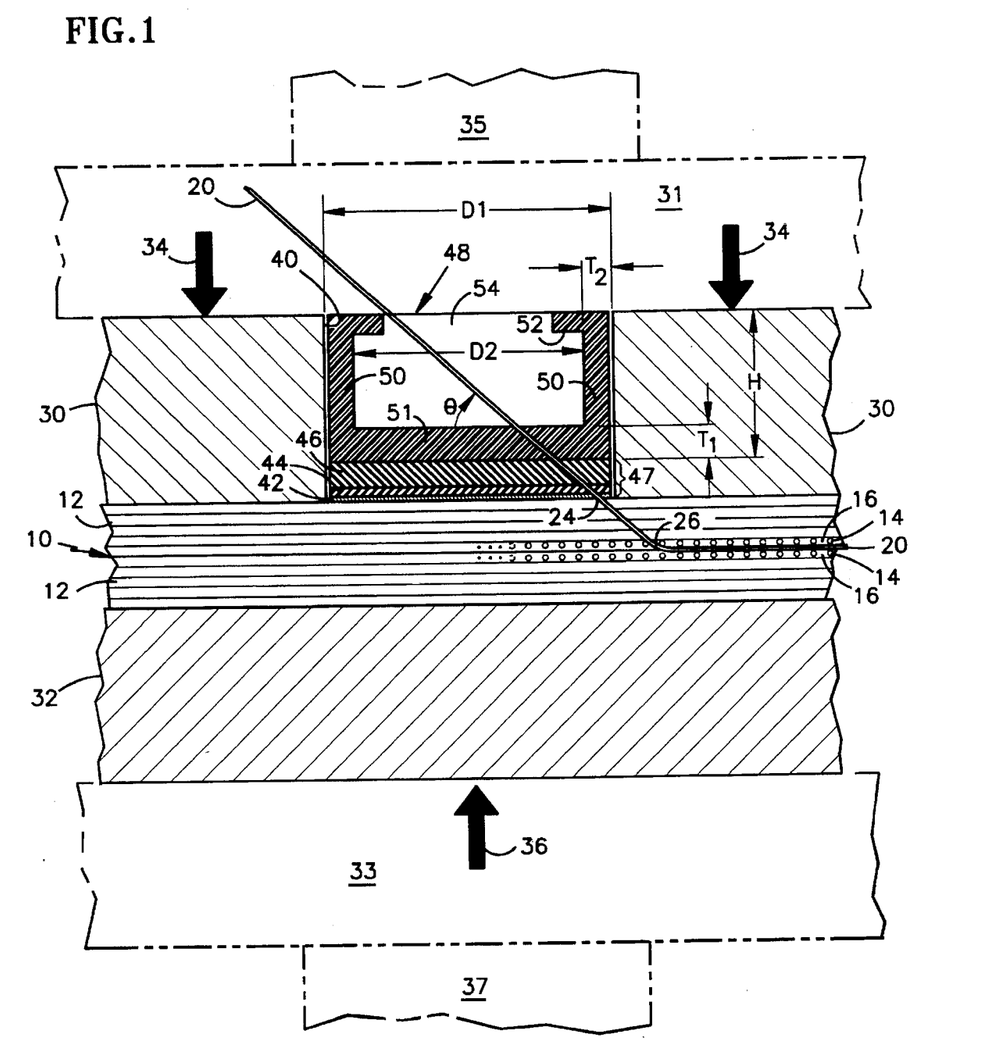
FIG. 1 is a side cutaway view of an interface for an optical fiber entry into a composite structure, in accordance with the present invention

Referring now to FIG. 1, a composite laminated structure 10 (or lay-up) comprises a plurality of stacked layers 12 (or laminations or plies). Each of the layers 12 comprises cylindrical reinforcing filaments 14 (shown partially in two layers) made of graphite or other materials which are embedded in the layers 12 in predetermined directions. The filaments 14 within a given layer 12 are substantially parallel to each other; however other orientations may be used if desired. Between and around the filaments 14 is a known polymer matrix 16, e.g., a thermal set epoxy resin, known in the industry. Other materials may be used for the filaments 14, and other thermal set polymer matrix materials may be used for the resin 16, if desired. For example, the filaments 14 may be made of glass (or fiberglass), nylon, cloth, carbon, aramid, KEVLAR® (polymer filament), or other materials. Instead of resin, any structure bonding material may be used if desired with the present invention. Also, the filaments 14 need not be cylindrical in shape. More detailed drawings and discussion of an example of such a lay-up are described in U.S. Pat. No. 5,399,854 entitled "Embedded Optical Sensor Capable of Strain and Temperature Measurement Using a Single Diffraction Grating", to Voto et al., and co-pending U.S. patent application Ser. No. (UTC Docket No. R-3857) entitled "Monitoring a Composite Structure Curing Process Using an Optical Fiber Grating Sensor", filed Nov. 21, 1995.

The lay-up 10 may be made from individual layers 12 comprising the filaments 14 preimpregnated with the resin 16 (or pre-preg) for use in compression molding, or by a dry cloth filament weave which is then injected with resin during manufacturing (i.e., resin-injection molding or resin transfer molding), as is known.

An optical fiber 20 is positioned in predetermined sensing locations within the lay-up 10 as the lay-up 10 is constructed, as discussed in the aforementioned U.S. Pat. No. 5,399,854 and the aforementioned patent application and enters (or exits) the lay-up 10 at a fiber entry point 24 (embedding of fiber discussed more hereinafter).

The fiber 20 comprises a typical communications single spatial mode fiber having a germania-doped silica core with a diameter of about 6 microns within a silica cladding having a total outer diameter (core and cladding) of about 125 microns. Other fiber compositions, sizes, and modes may be used if desired. Also, fibers with or without outer sheaths or buffer coatings may be used if desired. The core of the fiber 20 may have at least one reflective element (not shown) impressed therein if desired, such as a Bragg grating, similar to that described in U.S. Pat. No. 4,806,012, entitled "Distributed, Spatially Resolving Optical Fiber Strain Gauge" and U.S. Pat. No. 4,761,073, entitled "Distributed, Spatially Resolving Optical Fiber Strain Gauge", both to Meltz et al. The grating within the fiber 20 is also called a fiber grating "sensor" as discussed in the aforementioned U.S. Pat. No. 5,399,854 and the aforementioned patent application.

It should be understood that the layers 12 of the lay-up 10 are idealized isolated layers, and that in the final laminated (or consolidated or cured) composite structure, the layers 12 are not as well defined. In particular, the filaments 14 from one layer may likely be shifted during the curing process and be become relocated between the filaments 14 of other layers, and the resin 16 between and around the filaments 14 of one layer will combine with resin 16 from other layers, thereby removing any distinct boundary between the layers 12 in the final consolidated lay-up.

As is known, a known hot press device comprises an upper molding tool 30, a lower molding tool 32, an upper hot press plate 31 and a lower hot press plate 33. The plates 31,33 are connected to hydraulic pistons 35,37, respectively, which exert pressure on the tools 30,32. In particular, a predetermined amount of pressure is exerted on the upper and lower tools 32,30, respectively, as indicated by arrows 34,36, respectively, by the hot press plates 31,33 at known predetermined times during the lay-up consolidation process, thereby compressing the plies 12. Also during consolidation, concurrently with pressure being applied by the tools 30,32, the lay-up 10, as well as the tools 30,32, are raised to an elevated temperature environment by heating the hot press plates 31,33, e.g., using heater coils (not shown) embedded within the plates 31,33, or by another equivalent method, such as by an oven.

Figure 6:
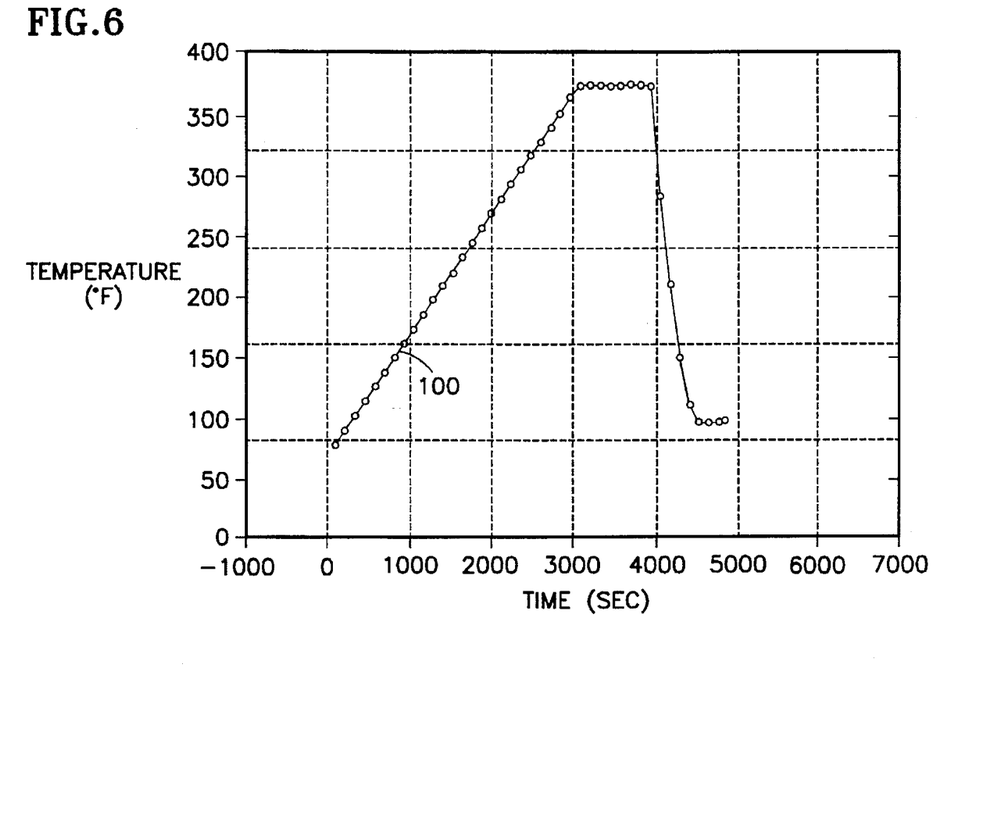
FIG. 6 is a graph of temperature versus time for a lay-up consolidation process, in accordance with the present invention.
Figure 7:
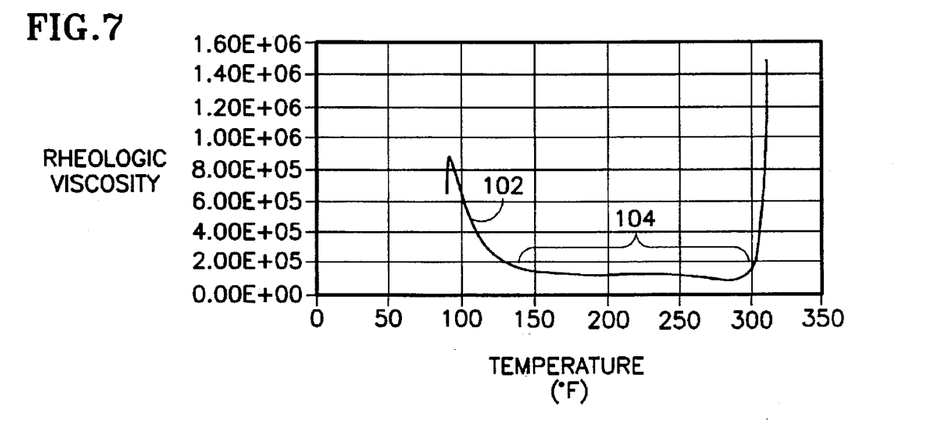
FIG. 7 is a graph of rheologic viscosity of resin in a lay-up versus temperature during a lay-up consolidation process, in accordance with the present invention.

Referring to FIGS. 6 and 7, a typical lay-up consolidation (or curing) temperature profile is shown by a curve 100 (FIG. 6), such as that shown in the aforementioned patent application, and the corresponding resin viscosity is shown by a curve 102 (FIG. 7). The viscosity curve 102 has a region 104 over a temperature range of about 130–300 Deg. F. where the resin exhibits a viscosity low enough to leak out of the lay-up 10. At temperatures above 300 Deg. F the resin begins to harden (or cure) and is fully hardened by the end of the temperature profile 100. Thus, the resin exhibits its lowest viscosity over the intermediate temperature range 104 during the consolidation process. The temperature range over which low viscosity occurs will vary depending on the type of resin material used.

As discussed hereinbefore, concurrently with the temperature profile 100, pressure is exerted by the tools 30,32, onto the lay-up 10. Accordingly, pressure builds up within the lay-up 10 and, when the temperature is in the region 104 where the resin has low enough viscosity, and the prior art technique is used (as discussed in the Background Art section hereto), the resin 14 leaks out (or bleeds out) from the fiber entry point 24 and any other holes in the tooling and structure. The present invention eliminates such leaks.

The specific temperature and pressure profile and ranges for lay-up consolidation will vary depending on the type of resin material used. Also, the sides of the tools 30,32 which face the lay-up 10 need not be flat as shown in FIG. 1; instead, they may have a shape resembling the desired shape of the resulting consolidated lay-up, e.g., thinner in some areas and thicker in others.

The mostly closed molding tool 30 has a cylindrical hole 40 having a diameter $D_1$, e.g., about 0.5 inches("), therein. Other diameters D1 for the hole 40 may be used if desired. In the hole 40 are three circular layers 42,44,46, collectively, transition layers 47 (or plies), and a cylindrical plug 48.

The optical fiber 20 passes through the plug 48, and the transition layers 47 and enters the structure 10 at the fiber entry point 24. The fiber 20 enters the lay-up 10 at an angle θ from the surface of the lay-up 10. The angle θ is small enough, e.g., less than about 45 Deg., such that excessive bending stresses are not exerted on the fiber 20 at a curvature point 26 where the fiber 20 transitions to a flat orientation along the lay-up 10. Other angles may be used for the angle θ if desired, depending on the fiber strength.

To prevent the fiber 20 from being crushed by the press plate 31, the fiber 20 may be spooled up inside the plug 48 (discussed hereinafter). Alternatively, grooves 49,49' may be made in the tool 30 and in the plug 48 (FIG. 3), respectively, and the fiber placed therein. In that case, the fiber 20 may be fed to external optical processing equipment (not shown) to actively monitor the curing process as discussed in the aforementioned patent application.

Regarding the transition layers 47 and the plug 48, the layer 42 is a thin layer of adhesive film against the upper side of the composite lay-up 10 having a typical thickness of about 0.010" and a diameter substantially equal to the diameter D1 of the hole 40. Other thicknesses and diameters may be used if desired. The adhesive film 42 bonds the upper surface of the lay-up 10 to the adjacent layer 44 (discussed hereinafter). Also, the layer 42 aides the seal around the fiber 20 entry point 24 (in addition to the seal provided by the other two layers 44,46, discussed hereinafter) if its melting temperature is lower than the temperature at which the resin exhibits minimum viscosity. One such adhesive film usable for the layer 42 is Part No. AF1632 made by 3M; however, other films may be used if desired.

Above the adhesive layer 42 is the layer 44 which is a thin rubber sealing layer having a typical thickness of about 0.010" and a diameter substantially equal to the diameter D1 of the hole 40. Other thicknesses and diameters may be used if desired. The rubber material of the sealing layer 44 is selected such that the temperature at which the rubber becomes soft enough to seal around the fiber 20 and around edges of the hole 40 is lower than the temperature at which the resin 16 in the lay-up 10 reaches a viscosity low enough (i.e., becomes fluid enough) to leak out of the lay-up ("low viscosity point"), such as the temperature at which the resin becomes a liquid. In particular, the sealing layer 44 fills the small entry hole 24 around the fiber 20 and any gap between the outer circumferential edge of the layer 44 and the inner surface of the hole 40 prior to the resin 16 reaching the aforementioned low viscosity point, thereby blocking the leakage of resin from the lay-up 10. One type of rubber usable for the sealing layer 44 is urethane and one urethane usable for the sealing layer 44 is BF Goodrich Part No. 74-851-182; however, other rubber types or other rubber urethanes may be used if desired.

Above the sealing layer 44 is the layer 46 which is a thick rubber strain relief layer having a thickness of about 0.060" and a diameter substantially equal to the diameter D1 of the hole 40. Other thicknesses and diameters may be used if desired. The layer 46 may be made of a high temperature rubber that does not decompose at the curing temperature of the resin in the lay-up (e.g., 370 Deg. F.), such as AIRPAD®, a B-stage acrylic rubber made by Airtech International Inc., or that used for the optical fiber interface in the aforementioned Italian Patent No. RM93A000253. Other high temperature rubber materials may be used for the strain relief layer 46 if desired provided it does not decompose at the curing temperature of the resin in the lay-up. The strain relief layer 46, similar to the sealing layer 44, also softens during the aforementioned consolidation temperature profile and bonds to and seals around the fiber 20 and the edges of the hole 40; however, its primary function is to provide a rubber strain relief layer for the optical fiber 20 that is thicker than the previously described thin rubber sealing layer 44. Thus, it is not required that the temperature at which the rubber of the layer 46 becomes soft enough to provide a seal be below the aforementioned low viscosity point of the resin.

Above the thick rubber layer 46 is the plug 48 which is a cylindrical plug made of a high-temperature polymer, such as Teflon. Other high temperature polymers that will not bond to the strain relief layer 46 during lay-up consolidation may be used if desired for the plug 48. The diameter of the plug 48 substantially the same as the diameter D1 of the hole 40 so as to provide a press fit into the hole 40 in the tool 30. The plug 48 comprises a cylindrical side wall 50, a lower wall 51, and an overhanging lip 52 which defines a plug cavity 54 (as discussed hereinafter). The lip 52 is not required but may be used for various functions, e.g., to contain extra optical fiber 20 which may be spooled-up within the plug cavity 54. Also, the plug 48 may have a seam 68 (FIG. 3), splitting the plug 48 into two halves, to facilitate removal of the plug 48 after lay-up consolidation.

The plug 48 is used to hold the transition layers 47 in place against upward pressures exerted by the resin 16 and filaments 14 caused by compressive forces exerted on the lay-up 10 by the tools 30,32 during lay-up consolidation. The lower wall 51 of the Teflon plug 48 has a bottom thickness $T_1$ of, e.g., 0.05–0.1", and the sidewall 50 has a thickness $T_2$ of, e.g., 0.05–0.1". The side-to-side distance (or diameter) $D_2$ of the inner surface of the wall 50 and the thicknesses $T_1, T_2$ of the walls 50,51, respectively, are sized to prevent the upward forces from the resin 16 and reinforcing filaments 14 within the layers 12 from deflecting the lower wall 51 upward into the cavity 54 of the plug 48. Also, the thickness $T_1$ of the lower wall 51 is designed to be thin enough to allow insertion of a hollow needle therethrough used to insert the optical fiber 20 (discussed hereinafter). The plug 48 has a height (H) such that the top of the plug 48 is substantially flush with or slightly above the upper surface of the tool 30 and the bottom of the plug 48 rests on the layer 46. Accordingly, the required height H of the plug 48 will vary with the thickness of the tool 30 and the amount of thermal expansion of the plug 48 and the transition layers 47 over the consolidation temperature profile. Thus, if the tool 30 has a thickness of about 0.5" and the layers 42,44,46 have thicknesses of about 0.010", 0.010", 0.060", respectively, the height H of the plug 48 would be about 0.420". For the materials discussed herein for the plug 48 and the layers 47, thermal expansion is not a significant factor. Other heights H for the plug 48 and other thicknesses for the tool 30 may be used if desired provided the plug 48 provides the required support (discussed hereinbefore) for the transition layers 47 during the consolidation process.

Once the structure 10, the optical fiber 20, the tools 30,32, the plug 48, and the transition layers 47 are all configured as shown in FIG. 1, the entire assembly is exposed to a lay-up consolidation (or curing) temperature and pressure profile such as that described hereinbefore.

The hole 40 and plug 48 may be a shape other than cylindrical, e.g., a cube or other shape, and the transition layers 47 may be a shape other than circular but may be the same cross-sectional shape as the hole 40 for easy placement into the hole 40.

Alternatively, the adhesive film layer 42 may be omitted if desired. In that case, the layer 44 would serve a dual role of providing a seal as well as providing adhesion to the upper surface of the lay-up 10. As such, the layer 44 would be made of a material which also adheres well to the lay-up material.

Figure 2:
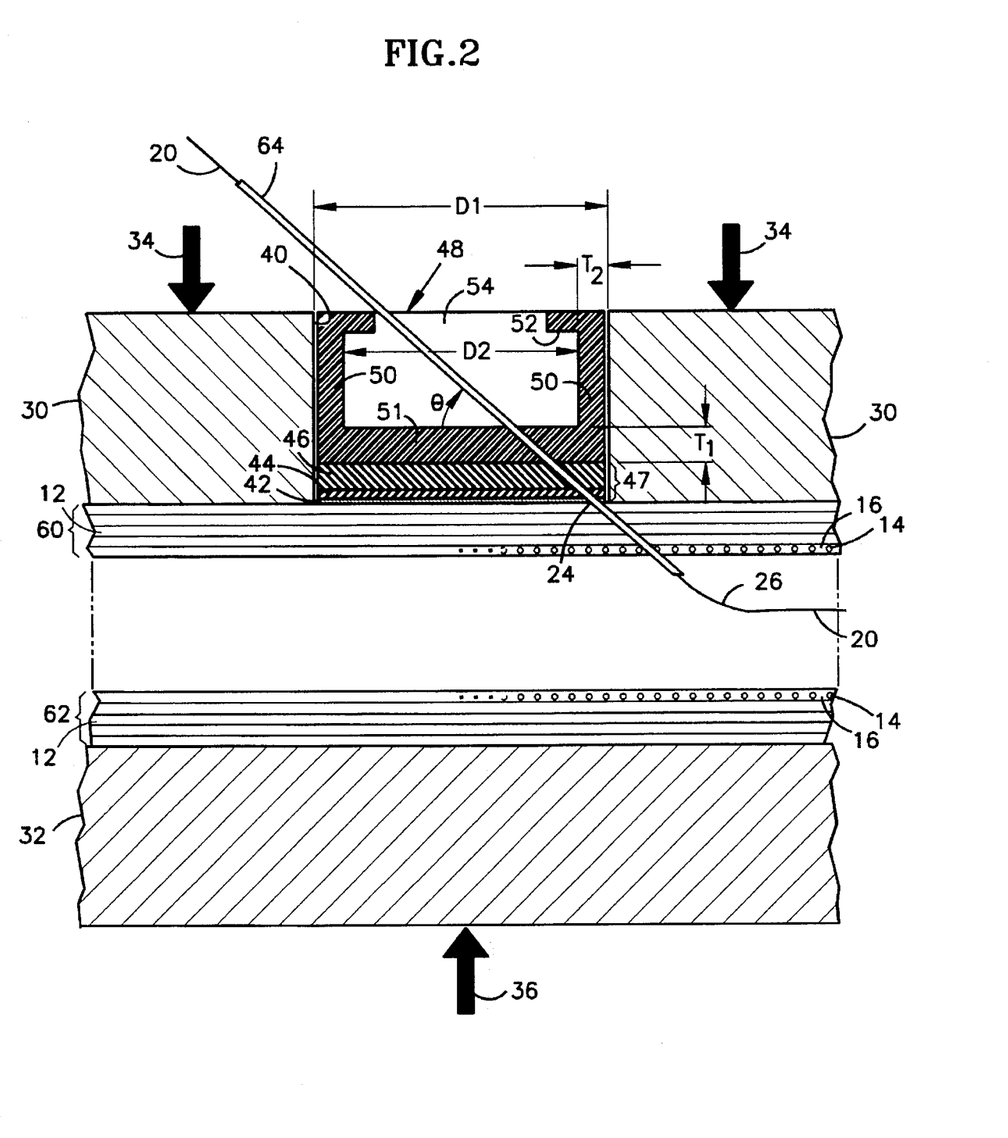
FIG. 2 is a side cutaway partially disassembled view of an interface for an optical fiber entry into a composite structure, in accordance with the present invention.
Figure 5:
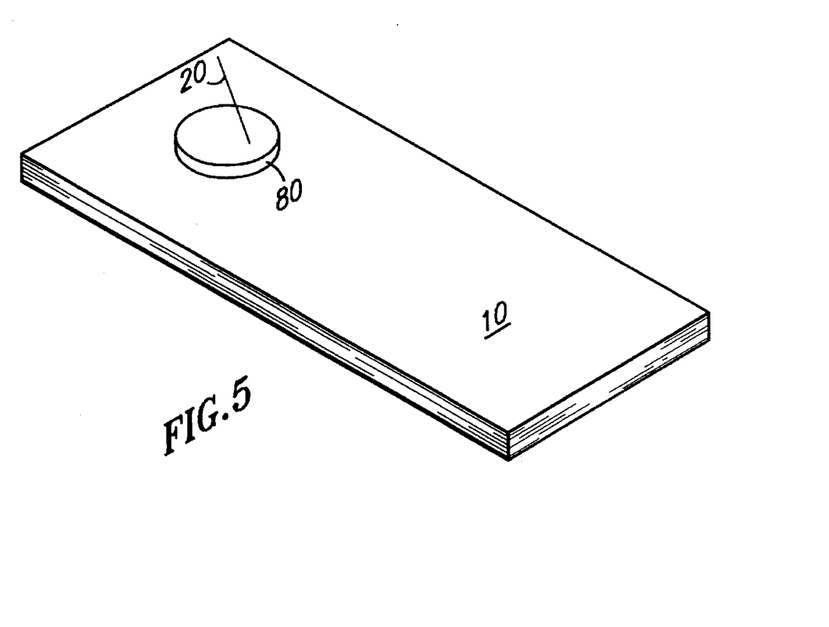
FIG. 5 is a perspective view of an optical fiber entering a consolidated composite structure through a cured rubber interface, in accordance with the present invention.

Referring to FIGS. 2 and 5, we have found the resulting consolidated configuration provides a flexible strain-relief optical fiber interface region 80 bonded to the surface of the lay-up structure 10 and to the optical fiber 20 near where the fiber enters the structure 10, and that there is no (or minimal) resin flow out of the lay-up 10 through the entry hole 24 around the fiber 20 or into the rubber 46 during lay-up consolidation.

Figure 3:
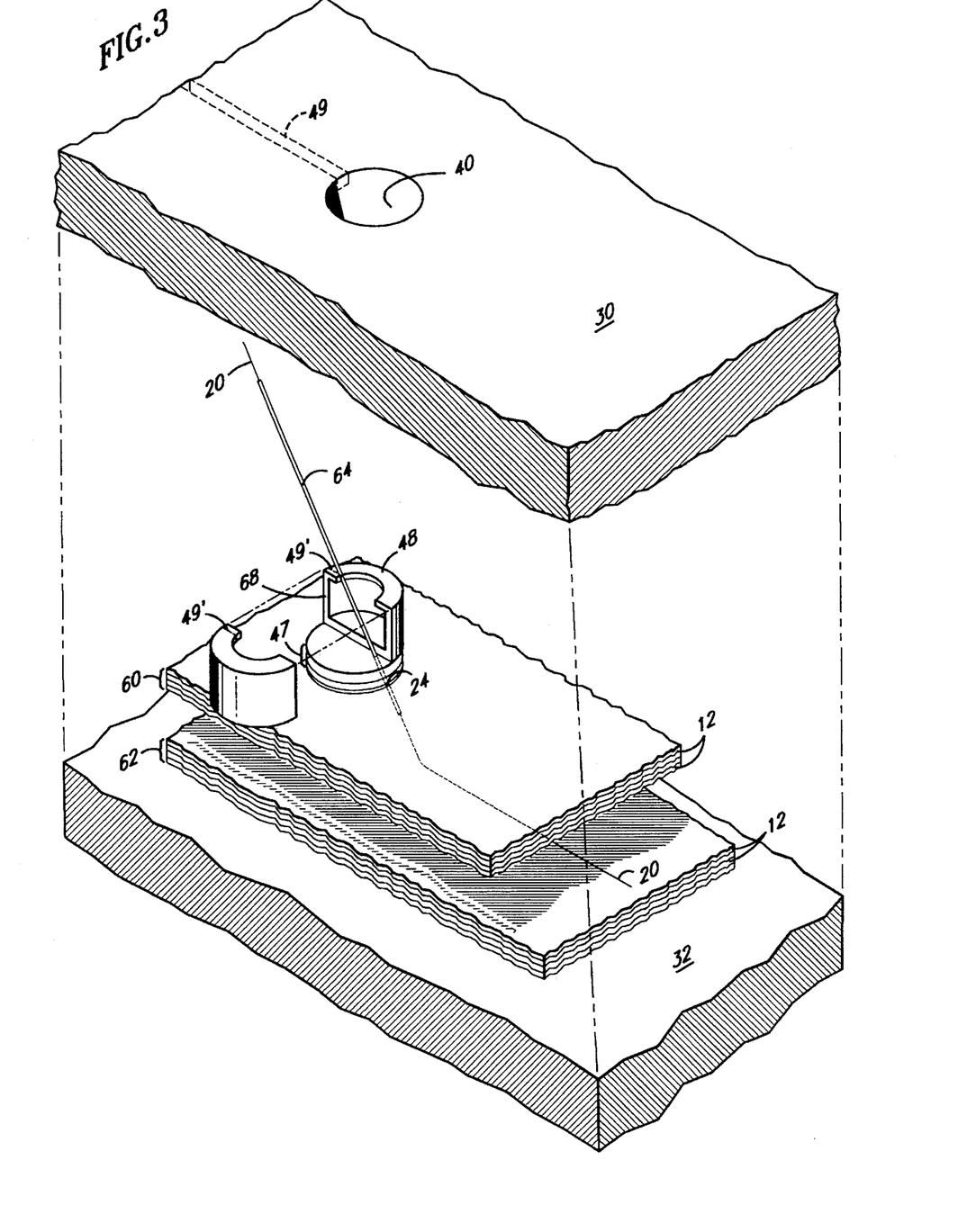
FIG. 3 is a perspective cutaway partially disassembled view of an interface for an optical fiber entry into a composite structure, in accordance with the present invention.
Figure 4:
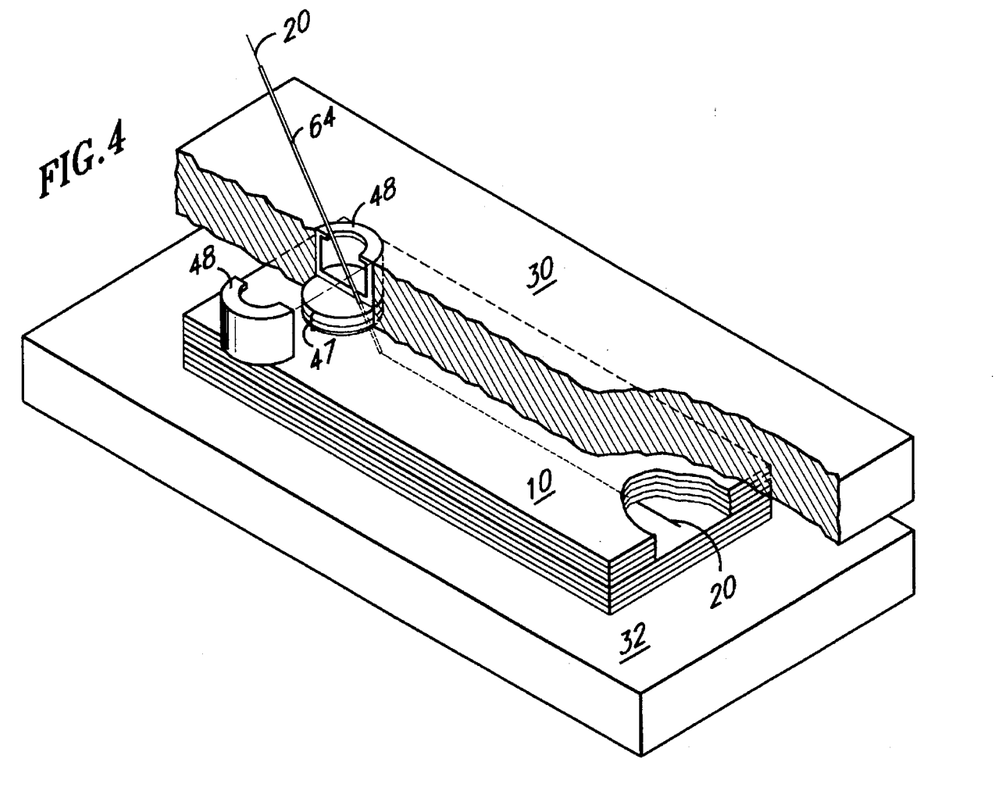
FIG. 4 is a perspective cutaway view of an interface for an optical fiber entry into a composite structure, in accordance with the present invention.

Referring now to FIGS. 2,3 and 4, one method for assembling the fiber 20 within the lay-up 10 comprises having the lay-up 10 partially assembled into a first portion 60 comprising a predetermined number of the layers 12 and a second portion 62 also comprising a predetermined number of the layers 12. Then, the circular transition layers 47 and the cylindrical plug 48 are placed in the hole 40 of the upper tool 30. Next, a hollow or hypodermic needle 64 is inserted through the plug 48, the transition layers 47, and the layers 12 of the first portion 60 of the lay-up 10. The needle 64 may pierce through a seam 68 of the plug 48 for ease of removal of the plug after lay-up consolidation. Next, the optical fiber 20 is inserted through the needle 64, and the sensing region(s) along the optical fiber 20 are placed into the desired measurement position(s) along the lay-up 10 between the regions 60,62. Then, the needle 64 is removed. Alternatively or additionally, the fiber 20 may be fed through another hypodermic needle (not shown) and through another exit point (not shown) located through the same or a different set of transition layers, such as that shown in the aforementioned Italian Patent No. RM RM93A000253. Then, the first portion 60 of the lay-up 10 is assembled with the second portion 62 with the optical fiber 20 sandwiched therebetween, thereby creating a complete (but unconsolidated) lay-up 10 having the embedded fiber, sensor(s) and fiber entry and/or exit points. As discussed hereinbefore, the angle θ at which the fiber 20 is inserted into the structure 10 should be small enough such that excessive bending stresses are not exerted on the fiber 20 at the curvature point 26. Next, the structure is exposed to the lay-up consolidation temperature and pressure profile discussed hereinbefore. Any other technique may be used for assembling the fiber 20 within the lay-up 10 and for feeding the fiber 20 through the transition layers 47 and the plug 48, if desired.

When the consolidation process is completed, the upper tool 30 is removed from the lay-up. The plug 48 may need to be split into two halves along the seam 68 to facilitate removal of the fiber 20 from the plug 48.

Even though the invention has been described as being used in conjunction with a lay-up consolidation process which uses closed or partially or mostly closed molding tools, it should be understood that the invention will work equally well with any lay-up consolidation process that exerts enough pressure on the lay-up to cause resin (or another lay-up bonding material) to leak out of the lay-up at the fiber entry point(s).

Also, instead of the lay-up or structure being a composite structure (i.e., being made of at least two different materials), the structure may be made of a single material that exhibits a viscosity low enough (i.e., becomes fluid enough) during lay-up consolidation to leak out of the structure, coat the fiber, and make the fiber more brittle. In that case, the reinforcing filaments in the lay-up would likely not be used.

Also, even though the invention has been described as being used with a single laminated structure, the invention will work equally well with complex geometric structures and/or "sandwich" structures, such as those with honeycomb inserts.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An optical fiber interface, comprising:

a structure comprising structure bonding material;

an optical fiber entering said structure at a fiber entry point and being embedded within said structure;

sealing means, disposed on said structure and having said fiber passing therethrough at a sealing pass-through region, for sealing around said fiber at said sealing pass-through region and for preventing said bonding material from leaking through said sealing means at said sealing pass-through region;

strain relief means, disposed adjacent to and contiguous with said sealing means and having said fiber passing therethrough at a strain relief pass-through region, for providing strain relief of said fiber near said fiber entry point; and said sealing means for bonding said strain relief means to said structure.

2. The optical fiber interface of claim 1 wherein said sealing means comprises:

a sealing layer which prevents said bonding material from leaking through said sealing pass-through region; and an adhesive layer having said fiber passing therethrough at said strain relief pass-through region, which bonds said sealing layer to said structure.

3. The optical fiber interface of claim 2 wherein said sealing layer comprises a material which becomes soft enough to seal around said fiber at said sealing pass-through region at a temperature lower than the temperature at which said bonding material exhibits a viscosity low enough to leak out of said structure, thereby preventing said bonding material from leaking through said sealing pass-through region during consolidation of said structure.

4. The optical fiber interface of claim 2 wherein said sealing layer comprises a rubber material.

5. The optical fiber interface of claim 2 wherein said sealing layer comprises urethane.

6. The optical fiber interface of claim 2 wherein said adhesive layer comprises an adhesive film.

7. The optical fiber interface of claim 2 wherein said adhesive layer also provides a seal at said fiber entry point which prevents said bonding material from leaking out of said entry point.

8. The optical fiber interface of claim 1 wherein said strain relief means comprises a rubber material.

9. The optical fiber interface of claim 1 wherein said strain relief means also seals around said fiber at said strain relief pass-through region.

10. The optical fiber interface of claim 1 wherein said bonding material comprises a thermal setting resin.

11. The optical fiber interface of claim 1 wherein said structure is a composite structure.

12. A Method for making an optical fiber interface, comprising the steps of:

obtaining a structure comprising a structure bonding material;

placing a molding tool on said structure, said molding tool having a hole therethrough;

placing a sealing material into said hole and onto said structure;

placing a strain relief layer into said hole and onto said sealing material;

placing a plug into said hole and onto said strain relief layer;

inserting an optical fiber through said plug, said strain relief layer, and said sealing material and into said structure, said fiber entering said structure at a fiber entry point, passing through said plug at a plug pass-through region, passing through said strain relief layer at a strain relief pass-through region, and passing through said sealing material at a sealing pass-through region;

heating said structure over a lay-up consolidation temperature profile which causes said bonding material to exhibit a viscosity low enough to leak out of said structure over a portion of said temperature profile; and applying pressure to said structure with said tool while performing said heating step so as to consolidate said structure.

13. The Method of claim 12 wherein said sealing material comprises:

a sealing layer which prevents said bonding material from leaking through said sealing pass-through region; and an adhesive layer having said fiber passing therethrough at said strain relief pass-through region, which bonds said sealing layer to said structure.

14. The Method of claim 12 wherein said sealing layer comprises a material which becomes soft enough to seal around said fiber at said sealing pass-through region at a temperature lower than the temperature at which said bonding material exhibits a viscosity low enough to leak out of said structure, thereby preventing said bonding material from leaking through said sealing pass-through region during said steps of heating and applying pressure.

15. The Method of claim 13 wherein said sealing layer comprises a rubber material.

16. The Method of claim 13 wherein said sealing layer comprises urethane.

17. The Method of claim 13 wherein said adhesive layer comprises an adhesive film.

18. The Method of claim 13 wherein said adhesive layer also provides a seal at said fiber entry point which prevents said bonding material from leaking out of said entry point.

19. The Method of claim 12 wherein said strain relief layer comprises a rubber material.

20. The Method of claim 12 wherein said strain relief layer also seals around said fiber at said strain relief pass-through region.

21. The Method of claim 12 wherein said plug comprises two parts joined at a seam, and said fiber is inserted through said seam in said step of inserting.

22. The Method of claim 12 wherein said plug comprises a polymer.

23. The Method of claim 12 wherein said plug comprises Teflon.

24. The Method of claim 12 wherein said bonding material comprises a thermal setting resin.

25. The Method of claim 12 wherein said structure is a composite structure.

* * * * *